May 15, 1945. M. NITESCU 2,375,940
CATALYTIC PROCESS FOR CONVERTING LIQUID AND GASEOUS HYDROCARBONS
INTO ANTIKNOCK SPIRIT AND AROMATIC HYDROCARBONS
Filed June 28, 1939
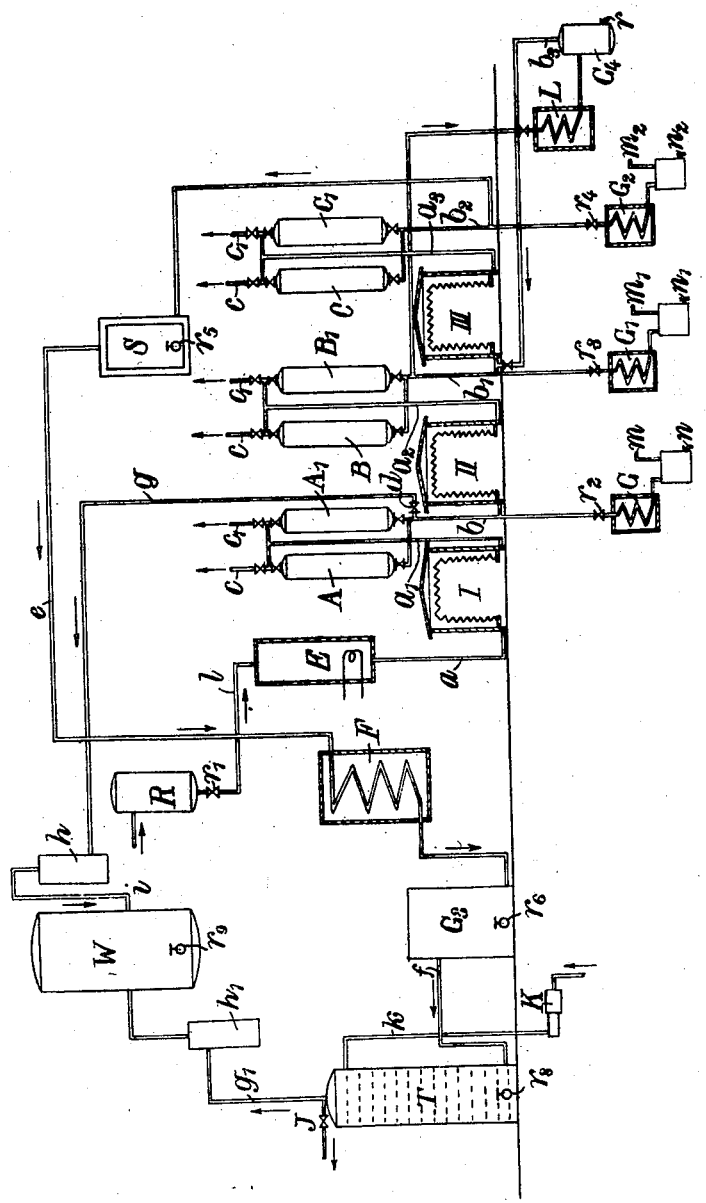
Inventor,
M. Nitescu
By: Glascock Downing & Seebold
Attys.

Patented May 15, 1945

2,375,940

UNITED STATES PATENT OFFICE 2,375,940

CATALYTIC PROCESS FOR CONVERTING LIQUID AND GASEOUS HYDROCARBONS INTO ANTIKNOCK SPIRIT AND AROMATIC HYDROCARBONS

Marcel Nitescu, Bucharest, Rumania; vested in the Alien Property Custodian

Application June 28, 1939, Serial No. 281,690
In Great Britain July 9, 1938

4 Claims. (Cl. 260—673.5)

This invention relates to an industrial process for converting liquid or gaseous hydrocarbons of various origins, having in general a paraffinic base, into anti-knock spirits and into aromatic hydrocarbons, selective catalysts being employed suitable for certain reaction groups duly characterised by the invention.

The use of selective catalysts has been studied with the object of obtaining anti-knock combustibles and aromatic hydrocarbons in the best conditions, enabling optimum conditions to be realised so that the intermediate reactions which precede the formation of the anti-knock spirits and aromatic hydrocarbons can take place with maximum yield and production of superior quality.

It is known that the principal chemical reactions for passing from paraffinic hydrocarbons with a large number of carbon atoms to anti-knock spirits and aromatic hydrocarbons are the following:

(1) Decomposition into gaseous olefines;
(2) Cyclisation of the olefines into lower saturated and unsaturated naphthenes;
(3) Dehydrogenation of the naphthenes with formation of monocyclic aromatic hydrocarbons.

These three main groups of reactions take place in the present invention in separate reaction spaces, which enable characteristic selective catalysts to be employed, in such a manner that the optimum conditions of the reaction can be realised as well as the immediate control of each stage separately.

Besides by the catalysts, the reaction spaces are characterised also by temperature, duration of contact, and pressure. By varying these elements according to requirements, and taking into account the characteristics of the primary material and those of the final product, it is possible to operate on various primary materials such as crude petroleum spirits, gaseous hydrocarbons or synthetic tars, thereby obtaining combustibles having a different physico-chemical composition. It is possible to employ selective catalysts and to vary to a maximum the working conditions (temperature, duration of contact, and pressure) only in a plant in which the reactions take place in separate, distinct and controllable spaces.

In conformity with the scheme of intermediate stages mentioned above, the process of the present invention is characterised by the following stages:

*1st stage.—Cracking and dehydrogenation*

Principal reactions:

(a) Decomposition of the heavy hydrocarbons of the petroleum fractions or of synthetic tars into gaseous olefinic and paraffinic hydrocarbons;
(b) Catalytic dehydrogenation of the lower paraffinic hydrocarbons into lower olefinic hydrocarbons;
(c) Alkylation of a part of the resulting olefines.

This stage is characterised by the following:

(a) Mixed catalysts which may be metallic oxides, oxides of iron, of nickel, iron and nickel combined with aluminium or aluminium oxide, as well as oxides of titanium, zirconium, cerium, alone or in admixture with hydrosilicates, as well as mineral acids (e. g. sulphuric acid);
(b) A temperature between 350° and 480° C.;
(c) A pressure of up to 50 atm. or more;
(d) A time of contact necessary for the gaseous product resulting from this stage, and which is analysed, to contain the maximum yield of olefinic hydrocarbons.

*2d stage.—Cyclo-polymerisation*

Principal reaction:

Cyclisation of the olefinic hydrocarbons into lower saturated and unsaturated naphthenes.

This stage is characterised by the following:

(a) Mixed catalysts which may be oxides of vanadium, of molybdenum, metal halogen compounds (e. g., metal halides), oxides of metalloids as well as organo-metallic compounds (naphthenates of heavy metals);
(b) A temperature of 460° to 560° C.;
(c) A pressure below 20 atm.;
(d) A contact time necessary for the olefines of the gaseous product resulting from the first stage to be transformed practically completely into cyclic compounds. This may be controlled by the analysis of the product effected at the end of the stage.

*3d stage.—Aromatisation*

Principal reaction:

Dehydrogenation of the naphthenes into monocyclic aromatic hydrocarbons.

This stage is characterised by:

(a) Mixed catalysts which may be nickel in various forms, oxides of aluminium, oxides of cobalt;

(b) A temperature of 250° to 450° C.;
(c) A pressure of up to 15 atm.;
(d) A contact time necessary for the aromatisation to be complete.

The catalysts may be introduced into well-insulated reaction towers on flat surfaces or in tubes in the form of granules or adsorbed on ceramic supports.

Moreover the catalysts may be readily regenerated if care is taken that no coke deposits form in any of the stages.

The accompanying drawing represents the general installation scheme for carrying out the process according to this invention.

Referring to the accompanying drawing, the primary material passes from the reservoir R by way of the cock $r_1$ and the pipe $l$ into the evaporator E where complete evaporation takes place. From the evaporator E the vapours pass through the insulated pipe $a$ into the furnace I connected by way of the conduit $a_1$ to two or more catalytic towers, A and $A_1$. The accompanying drawing indicates schematically only two towers. Whilst one of the towers, for example A, is carrying out its catalytic function, the other tower $A_1$ is devoted to reactivating the catalyst. The valves $c$ and $c_1$ serve for making connection with the flue or chimney whilst the catalysis towers are being regenerated. By way of the insulated conduit $b$ the gases which escape from the catalysis tower A pass into the furnace II, likewise connected by means of conduit $a_2$ to two or more catalysis towers B and $B_1$, operating in the same way as the towers A and $A_1$. Through the insulated conduit $b_1$ the gases which escape from the towers B or $B_1$ pass into the last furnace III, which is also connected through its pipe $a3$ with two or several catalysis towers C and $C_1$.

The cocks $r_2$, $r_3$ and $r_4$ serve for removing specimens for the analyses carried out at each of the thermocatalytic stages I, II and III so that progress of the operation can be continuously supervised and controlled. At each cock there is connected an ice-cooled coil G, $G_1$ and $G_2$, each coil being in communication with a seperator. The condensed product is separated off through the pipes $n$, $n_1$ and $n_2$ and the gases are collected by the pipes $m$, $m_1$ and $m_2$. By analysis of the liquid and of the gases coming from each stage the progress and the satisfactory conduction of the operation of the respective stages is ensured.

By way of the pipe $b_2$ the products pass into a separator S whence the asphaltic product which there separates can be removed through the cock $r_5$. The products then pass through the pipe $e$ to a cooling coil F and cooled thus pass into the gas separator $G_3$. The polymer is withdrawn through the cock $r_6$ whilst the gases pass through the pipe $f$ into an absorption tower T. The gas oil is conducted to the upper part of the absorption tower with the aid of a pump K by way of pipe $k$ and the spirit rich in gasolene vapours is withdrawn through the cock $r_8$ and submitted to distillation. The residual gases escape through the conduit J.

If it is desired to obtain a spirit which is not so rich in aromatics, the apparatus described above can be modified in the following way:

The gaseous mixture, after leaving the furnace II, is led toward a condenser L connected thereto, to which condenser is connected a gas separator $G_4$ in which the condensed liquid is removed through the cock $r$ and the non-condensed gases are re-introduced into the furnace III through the pipe $b_3$, after which the products follow the same course as above, passing through the separator S and so on.

The residual gases from J can be collected with a definite proportion of the gas arising from the furnace I and the mixture passed into the alkylation apparatus W. The cock $d$ regulates the quantity of olefinic gas being withdrawn from the furnace I, which gas is then led by means of the pipe $g$ and through the separator $h$ and pipe $i$ into the alkylation apparatus W. The residual gases from J are also led to this apparatus through the pipe $g_1$ and the separator $h_1$. The alkylated product is withdrawn through the cock $r_9$.

In this way the mixture of hydrocarbons in the vapour state traverses the heating spaces and then meets the selective catalysts and the characteristic conditions of each stage. Before entering the reaction towers the gaseous product also undergoes a molecular re-activation brought about by the various heatings to which it is submitted. The temperature therefore plays a double role.

The polymer which results is condensed and the gases are passed to the gas absorber.

*Example*

The primary material employed is a petroleum fraction distilling between 150° and 350° C. The following is the analysis of this fraction:

| | Per cent |
|---|---|
| Paraffinic hydrocarbons | 65.3 |
| Naphthenic hydrocarbons | 23.6 |
| Aromatic and olefinic hydrocarbons | 11.1 |
| | 100.0 |

In the first stage oxide of nickel and oxide of iron on hydrosilicate supports were employed as catalyst. The alkylising of the gases takes place in the presence of 96% sulphuric acid at a temperature of 25°–150° C. and at a pressure sufficient to maintain the products in the liquid state.

In the second stage oxide of molybdenum activated with metal halogen compounds, e. g., metallic halides, was employed, and in the final stage oxide of cobalt mixed with some nickel in powder form on supports of pumice stone.

By fractionating the product a spirit is obtained which, mixed with the spirit from the absorber, gives a fuel of the following characteristics:

Density: 15° C.=0.826
Distillation: commences at 42° and finishes at 185° C.; 60% come over up to 100° C.
Aromatic hydrocarbons_____%__ 84.4
Olefinic hydrocarbons_____%__ 1.1
Octane No. 96 (C. F. R.)

On fractionally distilling the spirit obtained aromatic hydrocarbons of superior quality can be obtained.

| Mean yields | Per cent |
|---|---|
| Benzene | 20–25 |
| Toluene | 12–20 |
| Alkylated aromatics | 8–10 |

Yield of spirit with respect to the primary material: 72.5.

By the alkylation of the residual gases in the presence of a part of the gaseous olefines withdrawn from the first stage a spirit has been obtained having a density of 0.725 at 15° C. representing 6% by weight of the primary material and having an octane number of 91.

I claim:

1. A process for making aromatic hydrocarbons of high anti-knock rating which comprises vaporizing a liquid, paraffinic hydrocarbon, passing the vaporized material at a temperature ranging from about 350 to 500° C. through a reaction zone in contact with a cracking and dehydrogenating catalyst, heating the resultant reaction products to a temperature within the range of about 460 to 560° C. and passing through a second reaction zone in contact with a catalyst adapted to promote cyclization of the resulting olefinic hydrocarbons, then passing the resulting olefinic products through a third reaction zone at a temperature of 250–460° C. in contact with a catalyst adapted to promote the dehydrogenation of the resulting cyclicized hydrocarbons, the catalyst employed in at least two of said reaction zones being of a different character, the time of treatment in each zone being sufficient for the main reaction in that zone to proceed to a maximum extent.

2. A process for making aromatic hydrocarbons of high anti-knock rating which comprises vaporizing a liquid, paraffinic hydrocarbon, passing the vaporized material at a temperature ranging from about 350 to 500° C. through a reaction zone in contact with a cracking and dehydrogenating catalyst, consisting of oxide of iron and oxide nickel on a hydrosilicate support, heating the resultant reaction products to a temperature within the range of about 460 to 560° C. and passing through a second reaction zone in contact with a catalyst consisting of molybdenum oxide activated by metallic halides adapted to promote cyclization of the resulting olefinic hydrocarbons, then passing the resulting olefinic products through a third reaction zone at a temperature of 250–460° C. in contact with a catalyst consisting of oxide of nickel mixed with nickel powder on supports of pumice stone adapted to promote the dehydrogenation of the resulting cyclicized hydrocarbons, the catalyst employed in at least two of said reaction zones being of a different character, the time of treatment in each zone being sufficient for the main reaction in that zone to proceed to a maximum extent.

3. A process for making anti-knock spirit and aromatic hydrocarbons from hydrocarbon mixtures having a paraffinic base consisting in subjecting the hydrocarbon mixture in vapour form to a catalytic heat treatment under pressure in three definite and successive stages, each stage employing a catalyst adapted to catalyse the main reaction of that stage, viz. the production of olefine hydrocarbons in the first stage, the conversion of olefine hydrocarbons to cyclic compounds in the second stage, and dehydrogenation of the cyclic compounds of the second stage to aromatic hydrocarbons in the third stage, the temperature condition of each stage being adapted to promote the main reaction of that stage, the temperature of the first stage being 350 to 500° C., of the second stage 460 to 560° C. and of the third stage 250–460° C.

4. A process for making aromatic hydrocarbons of high anti-knock rating which comprises vaporizing a liquid, paraffinic hydrocarbon, passing the vaporized material at a temperature ranging from about 350 to 500° C. through a reaction zone in contact with a cracking and dehydrogenating catalyst, heating the resultant reaction products to a temperature within the range of about 460 to 560° C. and passing through a second reaction zone in contact with a catalyst adapted to promote cyclization of the resulting olefinic hydrocarbons, then passing the gaseous mixture through a condenser, removing the condensed liquid and passing the separated gases through a third reaction zone at a temperature of 250–460° C. in contact with a catalyst adapted to promote the dehydrogenation of the resulting hydrocarbons.

MARCEL NITESCU.